(12) United States Patent
McCarty et al.

(10) Patent No.: US 11,146,593 B2
(45) Date of Patent: Oct. 12, 2021

(54) LOCAL EVALUATION OF RUNTIME AUTHORIZATION RULES DERIVED FROM EXTERNALLY-DERIVED POLICY

(71) Applicant: International Business Machines Corporation, Armonk, NY (US)

(72) Inventors: Richard James McCarty, Austin, TX (US); Pradeep Kadiyala, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 16/408,645

(22) Filed: May 10, 2019

(65) Prior Publication Data

US 2020/0358823 A1 Nov. 12, 2020

(51) Int. Cl.
*H04L 29/06* (2006.01)
(52) U.S. Cl.
CPC ............ *H04L 63/20* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 2009/0064272 A1* | 3/2009 | Goldszmidt | G06F 21/6227 726/1 |
| 2009/0183236 A1* | 7/2009 | Ben-Ezra | G06F 21/6227 726/4 |
| 2017/0302702 A1* | 10/2017 | Hu | G06F 21/316 |

* cited by examiner

*Primary Examiner* — Cai Y Chen
(74) *Attorney, Agent, or Firm* — Jeffrey S. LaBaw; David H. Judson

(57) ABSTRACT

An application-centric authorization model utilizes locally-evaluated rules derived from non-local policies and provided to the application via an authorization object, preferably in the subject's session context. Preferably, the approach does not involve a runtime determination regarding the policy or policies; rather, one or more existing policies are merely used to derive authorization rules associated with a subject, and which are then evaluated and enforced at runtime in a computationally-efficient manner within the local runtime context of the application or service.

24 Claims, 8 Drawing Sheets

```
{
"entities": [
{
"entity": "purchaseApprove",
"azRules": [
{
"source": "local",
"accessTypes": [
"create",
"update"
],
"qualifier": {
"range": {
"min": "0",
"max": "1000"
},
"context": [
"software"
]
}
},
{
"source": "local",
"accessTypes": [
"create",
"update"
],
"qualifier": {
"range": {
"min": "0",
"max": "10000"
},
"context": [
"hardware",
"services"
]
}
}
]
},
{
"entity": "purchaseRecordAccess",
"azRules": [
{
"source": "local",
"accessTypes": [
"read"
],
"context": [
"submitted",
"inprocess"
]
},
{
"source": "external",
"accessTypes": [
"create",
"read",
"update",
"delete"
],
"external": {
"endpoint": "https://authorizeme.com",
"authenticator": "xyzzyABDCEFG12345"
}
}
]
}
]
}
```

FIG. 11

LOCAL EVALUATION OF RUNTIME AUTHORIZATION RULES DERIVED FROM EXTERNALLY-DERIVED POLICY

BACKGROUND OF THE INVENTION

Technical Field

This disclosure relates generally to application authorization in a computing environment.

Background of the Related Art

Whether accessing a website or a mobile app, users have high expectations of the applications that they regularly use. As a result, companies must continuously deliver new features and fixes. In the past, this process was painful because an application was usually developed, built, and made available as a single, often monolithic, application. Microservices is an application architectural style in which an application is composed of many discrete, network-connected components called microservices. In this approach to application design and management, large monolithic applications are broken into small services. A single network-accessible service is the smallest deployable unit for a microservices application. Typically, each microservice is optimized for a single function and runs in its own process. Communications between microservices typically are conducted through RESTful APIs and message broker services. Preferably, a microservice is configured to be continuously integrated (CI) and continuously delivered (CD). Businesses that employ microservices receive many benefits including efficiency, simplified deployment and maintenance, improved application quality, and scalability.

As businesses increasingly move toward creating applications in concert with microservices models, the topic of authorization must also be considered. In a microservices implementation, there may be certain access control mechanisms available at one or more infrastructure layers but, as the business logic becomes more complex, the requirement for more powerful policy based models that can accommodate such logic creates implementation difficulties. This has created a need for policy-driven authorization models that are well-suited to microservices, while minimizing overhead. Existing models for authorization services, however, do not meet this need.

In particular, external authorization engines, which cleanly separate authorization decisions from application logic, theoretically are well-suited to emerging microservices models, as well as to many application architectures, e.g., monolithic architectures, object-oriented architectures, and others. Consider a microservices architecture as an example. Employing such engines with microservices raises significant scalability and performance concerns given the overhead of repeatedly calling the authorization service. To mitigate this, caching of authorization decisions can be implemented within applications, but this approach would only work well for use cases where repeated authorization decisions must be made against the same entity/object/action. Where there is less repetitive authorization behavior, however, authorization decision caching is less effective. Another approach would be to embed the authorization engine within the context of the application/service itself, manage the policies externally, and then push (or pull) the policies to the application, where the authorization engine operates against a local copy. This type of solution creates certain management and distribution issues with policy data stores, especially when the component separation is less than optimal. This latter type of model is more aligned with monolithic application architectures, as opposed to microservices.

While the above authorization approaches work well for their intended purposes, they all have inherent tradeoffs relative to usability, scalability, and performance.

There remains a need to provide an authorization approach that addresses these issues and that provides efficient evaluation of authorization requests for an application architecture.

BRIEF SUMMARY

This disclosure provides for a hybrid approach that allows for policy to be driven through a centrally-managed model, while at the same time allowing optimized authorization checks to be made within a local runtime application or service context. The approach facilitates centrally-driven authorization policies to be utilized for applications/services but without the need for direct connectivity to a common authorization service at the time of the authorization decision. Rather, in this approach, one or more authorization rules ("azRules") are pre-computed against one or more external service(s) managing a set of enterprise policies. In one embodiment, the azRules are created at application session creation time, and they are communicated to the application or downstream services within the context of the user's session object or other appropriate state mechanism. The azRules represent a normalized set of rules that can be locally evaluated within the application context but are still driven by externally defined/managed "higher-level" policies. Preferably, the rules provide for a rich set of functionality for local evaluation of authorization decisions while minimizing the potential overhead of evaluating governing policies. In response to a request from an application/service for which an authorization decision is required, the azRules are evaluated, and an appropriate response to the authorization decision is returned to the application based on runtime-evaluating just the rules, and not the remotely-supported policy.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 11 depicts an example azRules authorization object.

DETAILED DESCRIPTION

Figure 1:
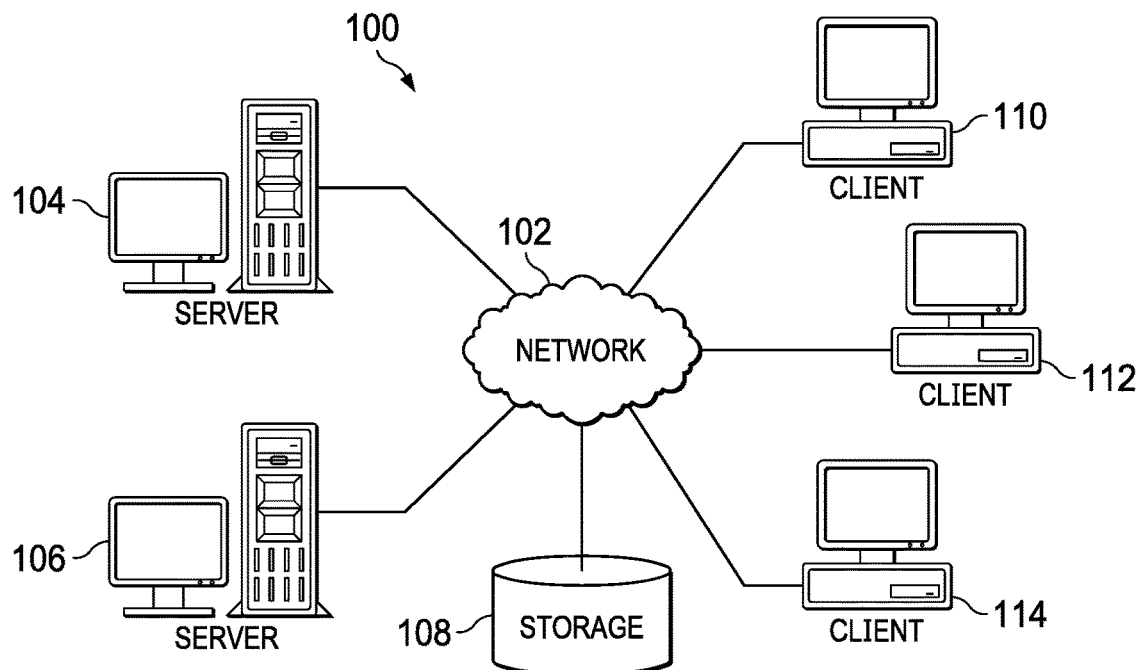
FIG. 1 depicts an exemplary block diagram of a distributed data processing environment in which exemplary aspects of the illustrative embodiments may be implemented.
Figure 2:
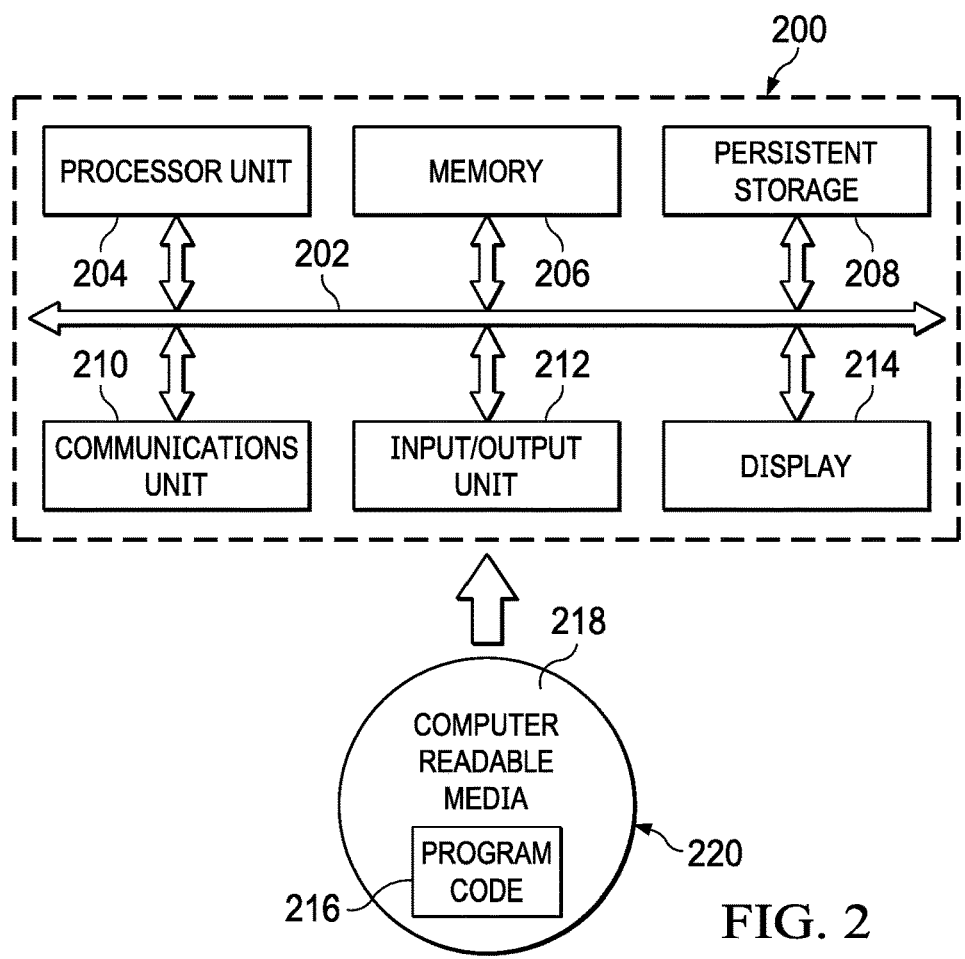
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse.

Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

In particular, typical characteristics are on-demand self-service, resource pooling, rapid elasticity, and measured service. The service models typically are: Software as a Service (SaaS), i.e. the capability provided to the consumer is to use the provider's applications running on a cloud infrastructure; Platform as a Service (PaaS), i.e. the capability provided to the consumer is to deploy onto the cloud infrastructure consumer-created or acquired applications created using programming languages and tools supported by the provider; and Infrastructure as a Service (IaaS), i.e. the capability provided to the consumer is to provision processing, storage, networks, and other computing resources where the consumer is able to deploy and run arbitrary software, which can include operating systems and applications. The deployment models typically are: private cloud, wherein the cloud infrastructure is operated solely for an organization; community cloud, wherein the cloud infrastructure is shared by several organizations and supports a specific community that has shared concerns (e.g., mission, security requirements, policy, and compliance considerations); public cloud, wherein the cloud infrastructure is made available to the general public or a large industry group and is owned by an organization selling cloud services; and hybrid cloud, wherein the cloud infrastructure is a composition of two or more clouds (private, community, or public) that remain unique entities but are bound together by standardized or proprietary technology that enables data and application portability.

A representative cloud computing node is as illustrated in FIG. 2 above.

Figure 3:
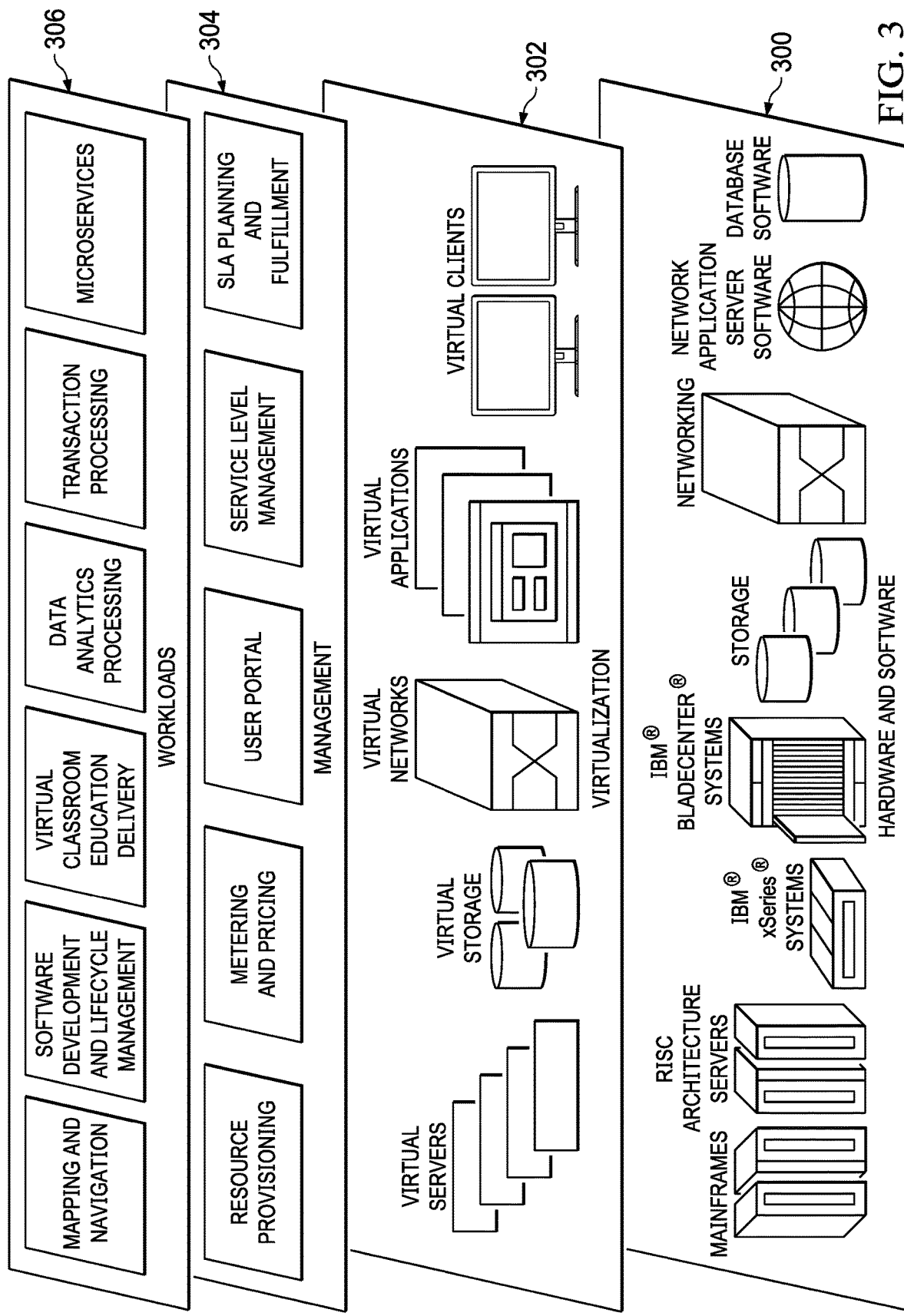
FIG. 3 depicts a representative cloud computing environment.

FIG. 3 depicts functional abstraction layers provided by a typically cloud computing environment is shown. Hardware and software layer 300 includes hardware and software components. Virtualization layer 302 provides an abstraction layer from which the following examples of virtual entities may be provided: virtual servers; virtual storage; virtual networks, including virtual private networks; virtual applications and operating systems; and virtual clients. Management layer 304 provides resource provisioning, metering and pricing, security, a portal, service level management, Service Level Agreement (SLA) planning and fulfillment, and the like. The workloads layer 306 provides functionality for which the cloud computing environment may be utilized. Examples of workloads and functions which may be provided from this layer include: mapping and navigation; software development and lifecycle management; virtual classroom education delivery; data analytics processing; transaction processing, and in the context of this disclosure, an external-based policy service. The cloud workload may also be a microservice or a component thereof.

Policy Definition, Management and Administration

Figure 4:
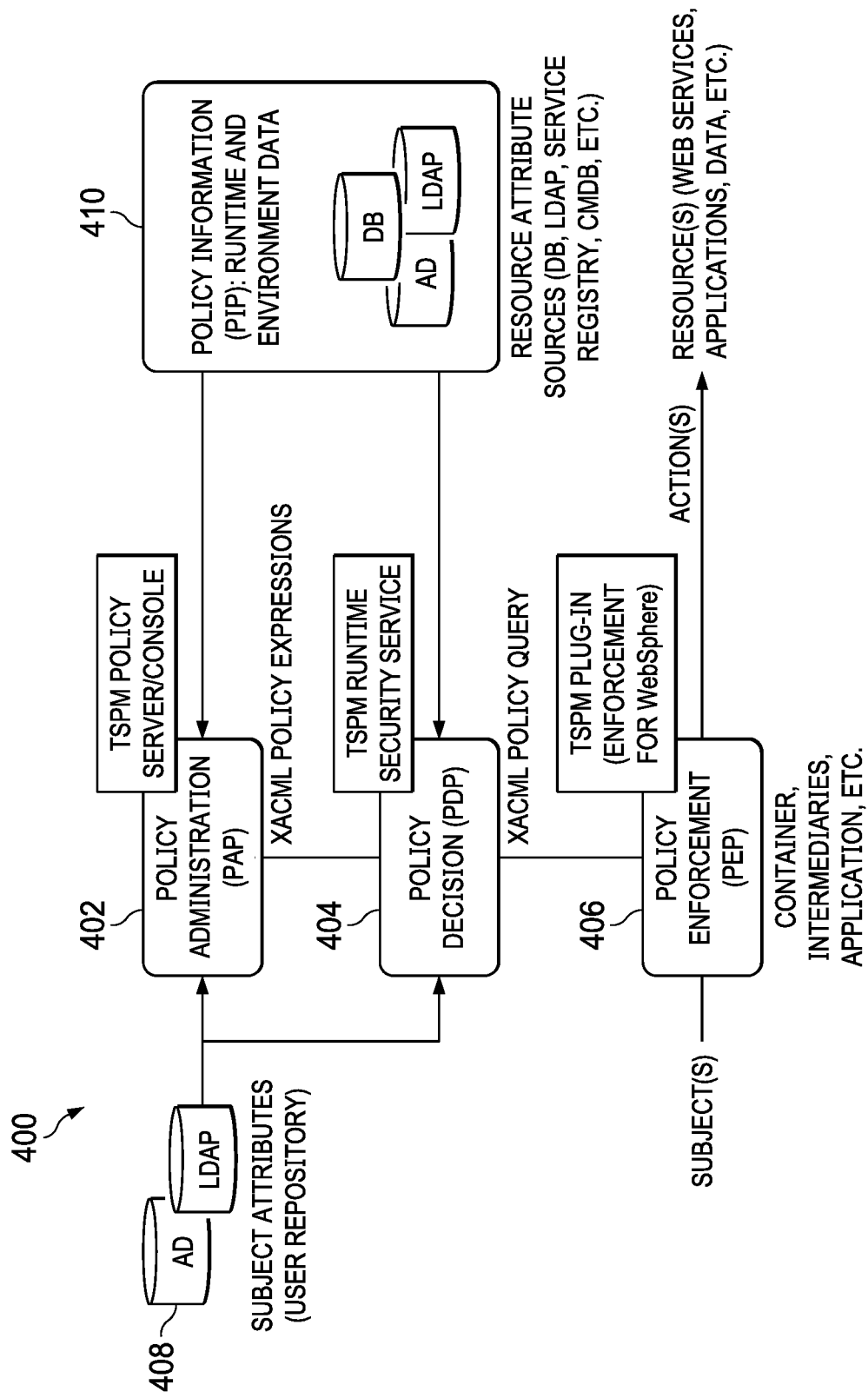
FIG. 4 depicts a known policy management system for authoring, distributing and enforcing policies.

By way of additional background, FIG. 4 illustrates a representative policy management system 400. The system 400 may be implemented across one or more machines operating in a computing environment, such as shown in FIG. 1. Typically, the system comprises a policy administration point (PAP) 402, the policy decision point (PDP) 404, and a policy enforcement point (PEP) 406. Generally, policy administration point 402 is used to define a policy, which may be specified as a set of XACML policy expressions. This policy uses subject attributes provided from a user repository 408, as well runtime and environment data received from policy information point (PIP) 410. The policy decision point (PDP) 404 receives similar information and responds to an XACML policy query received from the policy enforcement point (PEP) 406 to enforce the policy on a subject and with respect to a particular action initiated by the subject. The PDP 404 implements the policy decision. In one commercial implementation of this approach, the PAP 402 is implemented by IBM® Tivoli® Security Policy Manager (TSPM) policy service/console, the PDP 404 is implemented in the TSPM runtime security service, and the PEP is implemented as a TSPM plug-in to application server, such as IBM WebSphere® Application Server.

The policy management system may be implemented using one or more computing machines, such as shown in FIG. 2.

The policy administration point typically includes a web-based user interface by which a policy may be authored and distributed.

Runtime Authorization Schemes

Figure 5:
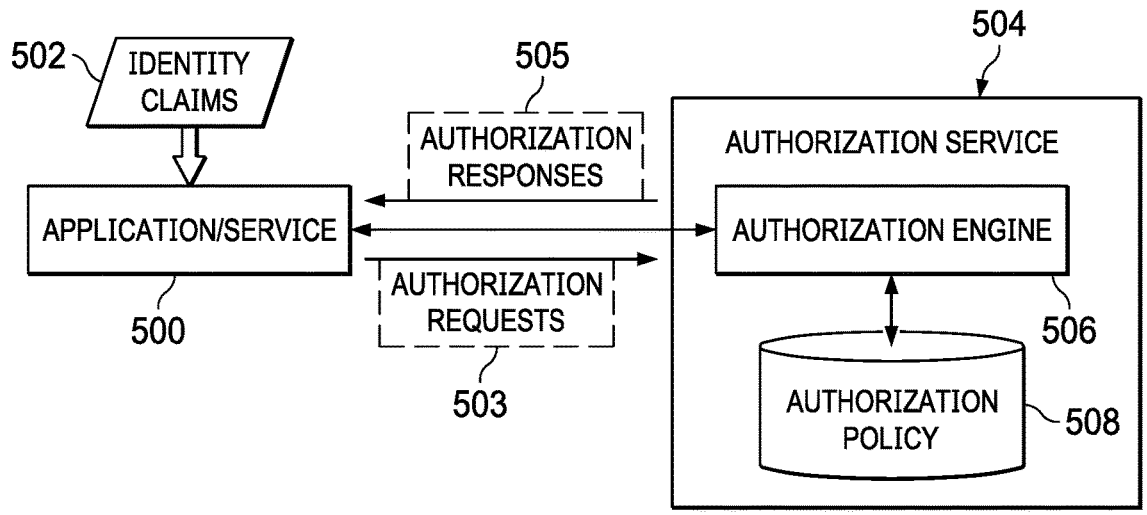
FIG. 5 depicts a known approach to authorizing a user's identity claim to an application using an external authorization service.

FIG. 5 depicts an implementation of an external authorization engine that is known in the art. In this approach, an application/service 500 receives an identity claim 502 and issues an authorization request 503 to the authorization service 504. The authorization service 504 comprises an authorization engine 506, and a data source 508 that stores authorization policies. The authorization engine 506 consults the applicable authorization policy and returns an authorization response 505.

Figure 6:
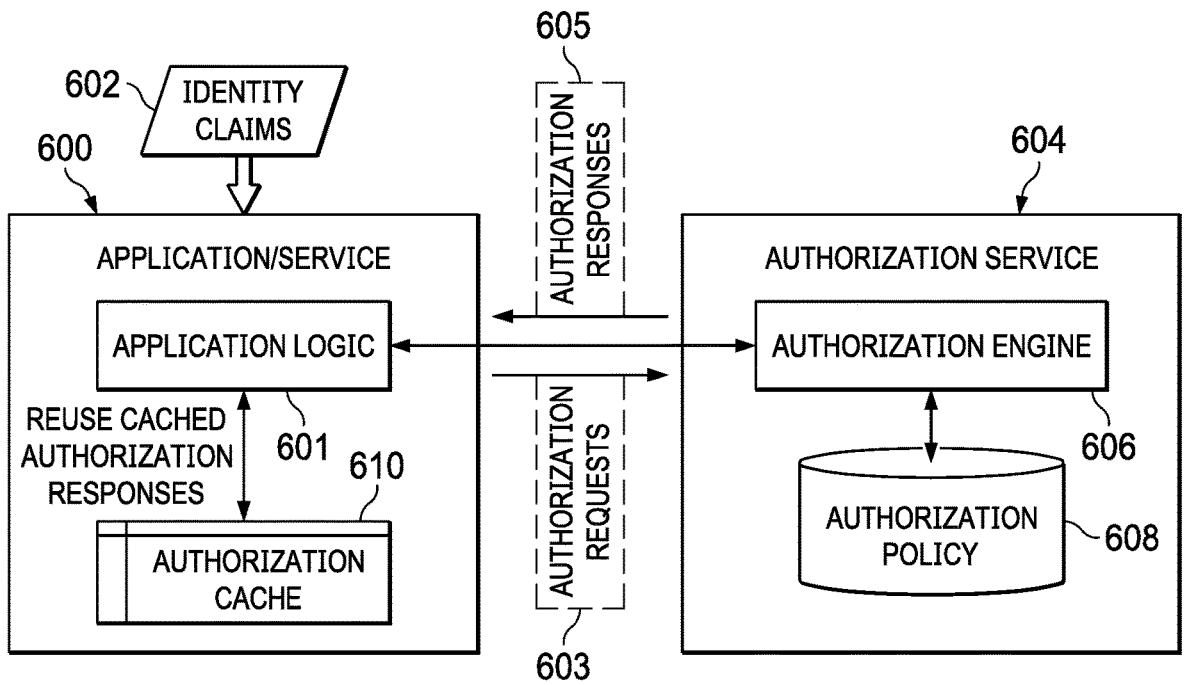
FIG. 6 depicts a known variant of the approach in FIG. 5 wherein authorization responses provided by an external authorization service are cached locally in an application runtime environment.

FIG. 6 depicts a variant of the architecture in FIG. 5 wherein the application/service 600 has an associated authorization cache 610. In this variant, the application/service 600 receives an identity claim 602 and, via application logic 601, issues an authorization request 603 to the authorization service 604. As in FIG. 5, the authorization service 604 comprises the authorization engine 606, and the data source 608 that stores authorization policies. The authorization engine 606 consults the applicable authorization policy and returns an authorization response 605. In this embodiment, the authorization response 605 is cached for reuse in the authorization cache 610 using the application logic. This caching obviates return to the authorization service for another policy evaluation for the identity claim. This variant is sometimes referred to as authorization caching.

Figure 7:
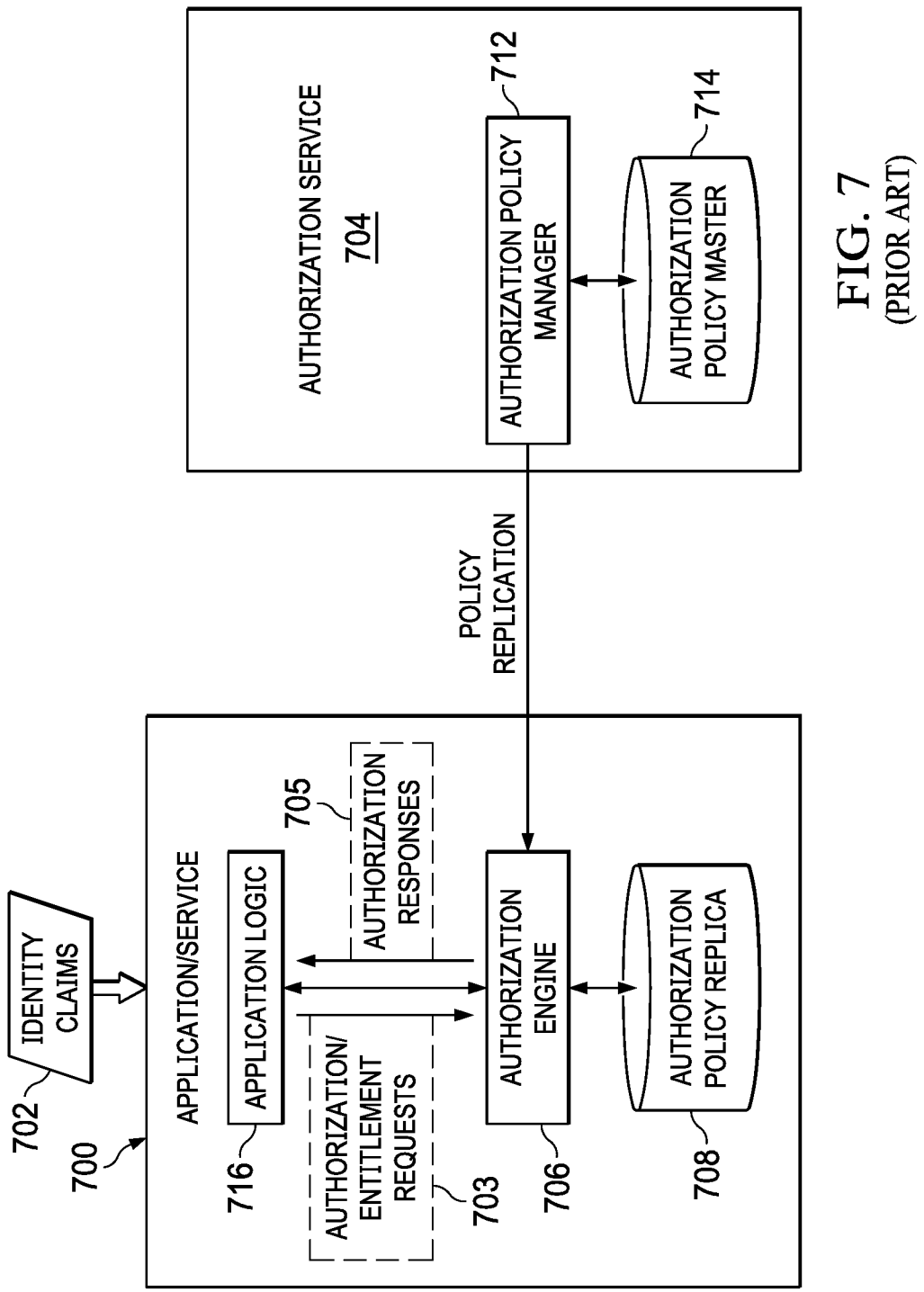
FIG. 7 depicts a further known variant of the approach in FIG. 5 or FIG. 6 wherein an application runtime environment includes a local authorization engine, and wherein an external authorization service provides policy management.

FIG. 7 depicts still another variant, but wherein the authorization engine runs locally in association with the application/service 700. In this embodiment, the external authorization service 704 provides just the policy management, and in this case using an authorization policy manager 712 and an associated data source in which an authorization policy master 714 is stored. In this embodiment, the authorization engine 706 runs locally and is accessed via application logic 716 that executes in association with the application/service 700. In operation, the application/service 700 receives an identity claim 702 and, via the application logic 716, issues an authorization/entitlement request 703 to the authorization engine 706. In this embodiment, the local authorization service comprises the authorization engine 706, and the data source 708 that stores an authorization policy replica. The replica is obtained from the external authorization service 704 and, in particular, from the authorization policy manager 712, which manages the authorization policy master store. To make the authorization decision, the authorization engine 706 consults the applicable authorization policy (in this case the replica) and returns to the application logic 716 an authorization response 705. This variant is sometimes referred to replicated policy management using local authorization.

The techniques above assume that application runtime authorization decisions typically can be computed without reference to an underlying policy. Thus, for example, in a transaction environment, the authorization decision may simply seek to determine whether a particular person can make a particular purchase (e.g., a $2,000 purchase). This authorization decision is a simple yes/no decision, and typically this determination is separate from whatever business policy controls it. As will be seen, an underlying motivation for the technique of this disclosure is that, in the above-described context for example, distillation of the authorization policy into a simplified form does not omit any useful information that the application needs in order to make the authorization decision. Continuing with this example, the underlying reason(s) why the particular person can or cannot make the $2000 purchase is not needed by the application; rather, the application just needs to know whether or not the person is permitted to do so.

Local Evaluation of Simplified Runtime Authorization Rules Derived from External Policy With the above as background, the technique of this disclosure is now described. As mentioned above briefly, the approach herein involves pre-computing application authorization rules for users, preferably against one or more external policy services. The pre-computed authorization rules preferably are then contained in an authorization object that is made locally accessible to an application or service. As will be described, an authorization object of this type is advantageous because it distills a higher level externally-maintained policy (e.g., a business policy) into a simple, easy-to-evaluate (computationally-speaking) form for efficient runtime use.

In particular, the approach herein provides for an authorization model in which a set of one or more authorization rules (referred to herein below as "azRules") preferably are pre-computed against one or more external service(s) managing a set of enterprise policies, ideally created at (but not necessarily restricted to) application session creation time, and communicated to an application or downstream services within the context of a user's session object or other appropriate state mechanism. Generalizing, the azRules represent a normalized set of rules that are configured to be locally evaluated within the application context but preferably are still driven by externally defined/managed policies. These particular rules will depend on the nature of the application and the authorization required; typically, but without limitation, the rules may be based on group memberships or roles, limit ranges, sets, events, occurrences, and the like, and they may also themselves refer to external authorization sources. Thus, and irrespective of their particular details the rules provide a rich set of functionality for local evaluation of authorization decisions while minimizing the potential overhead of evaluating governing policies.

In the approach herein, specific authorization decisions are separable from core application logic and evaluated locally while at the same time governance (for the authorization) is maintained, preferably via externally-defined policies. In a typical implementation, the application does not require knowledge of or access to the policies that create the rules, and preferably it can be completely disconnected from the enterprise policy engine implementation (e.g., FIG. 4) or an external authorization service (e.g., FIGS. 5-7). In other words, in the context of this disclosure, the policy decision point (PDP) remains external to the application/service, yet actual authorization decisions are made within an internal context.

According to this disclosure, preferably the azRules are encapsulated within an authorization object. Stated another way, the authorization object contains one or more rules. Thus, and in an example, an azRules object represents a collection of specific authorizations that can be made against various application entities (objects), incorporating specific permissions (e.g., CRUD-based), bounds/limits (e.g., maximum dollar amounts), scopes, and even when necessary, pointers routing back to an external authorization service (for certain authz decisions that cannot be made locally). An azRules object, however, does (and need) not represent whatever policies determined the authorizations and, therefore, azRules are implemented in a relatively simple form, and they are easily consumable within the context of an application/service.

In one embodiment, the azRules object evaluation executable code may be implemented as a runtime library, thereby enabling the application or service itself to perform authorizations locally without needing to know anything about how the rules are formatted or evaluated. In this approach, an azRules object is created in a simplified and preferably standardized format, e.g., comprising a collection of individual rules referring to entity/object names relevant to the application, together with appropriate authorization information. As noted above, the azRules object preferably is structured to be easily evaluated within an application/service context. For example, the rules may be encapsulated within a JavaScript Object Notation (JSON) object that is easily passed on to and consumed by an application/service. A JSON object is not a limitation, however, as other implementations (e.g., a data array, a linked list, an XML object, a YAML object, etc.) may be utilized.

Preferably, an external service is used to create an azRules object that is specifically tailored to the requirements of the target application. Generally, applications contain a limited set of authorization points, although some points may be repeatedly evaluated. Preferably, the azRules object is created to reflect only those policies applicable relative to the application/service. Preferably, it is relatively small in size, easily maintained and communicated through an attribute that may be encapsulated within other state/session information the application/service uses. Without intending to be limiting, an azRules object implementation may reference attribute claims contained within an overall session context, under the assumption that the azRules object itself is contained within the session context and thus is accessible to the application/service. The azRules format may also incorporate a macro functionality to reference such claims.

Figure 8:
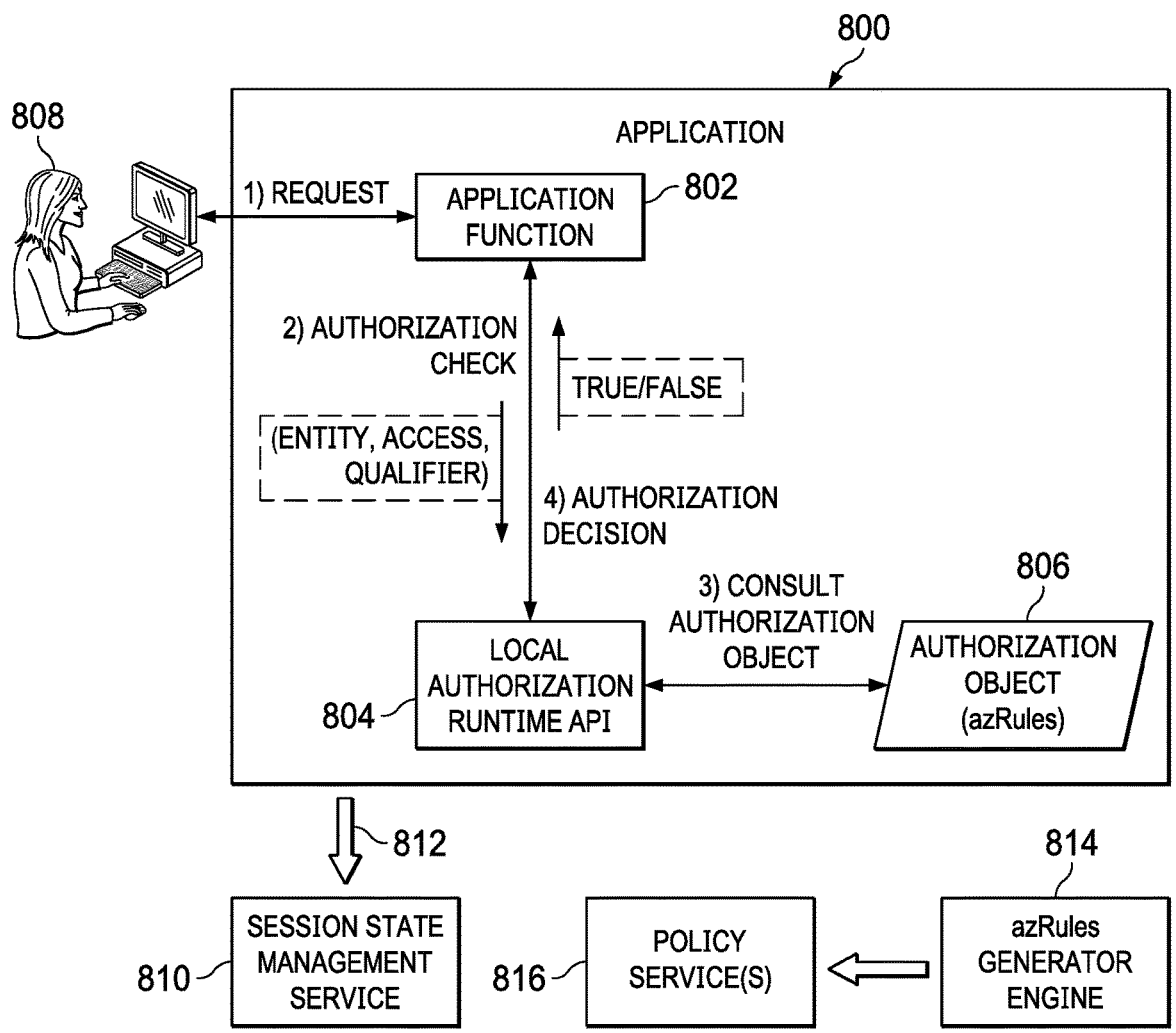
FIG. 8 depicts a basic operating scenario of this disclosure wherein local evaluation of simplified runtime authorization rules derived from externally-defined policies is enabled for an application.

FIG. 8 depicts the basic operating scenario for the technique of this disclosure. As depicted, the application 800 comprises an application function 802, a local authorization runtime Application Programming Interface (API) 804, and the one or more authorization objects 806 (azRules) of this disclosure. The workflow proceeds as follows. The user 808 makes a request to the application, which is step (1). In response, the application function 802 determines that an authorization check (step (2)) is requested. It forwards information (e.g., entity, access, qualifier) needed to perform that authorization check to the local authorization runtime API 804. The local authorization runtime API 804 consults the necessary authorization object 806 at step (3) to perform the runtime authorization checking using the azRules. If the authorization passes, the processing by the application function proceeds.

As depicted, and in the operating scenario depicted, there is a session state management service 810. For example, the session state management service 810 may be implemented as a session cache that maintains user session "objects" containing claims. Thus, typically the service comprises a component of a local runtime execution environment. A mechanism 812 (e.g., a request-response protocol) enables the application 800 to access the session data. As also shown in FIG. 8, an azRules generator engine 814 also is provided, and this engine is configured to interface with policy service (s) 816 in a manner described below to create user-specific azRules objects. The azRules generator engine 814 typically is tailored to the particular authorization requirements of the application 800. As previously described, the application 800 comprises one or more application functions (such as 802 and/or microservices) that process requests on behalf of the client (user) 808. As described, the azRules runtime API Library implementation provides the azRules evaluation within the application or service.

Figure 9:
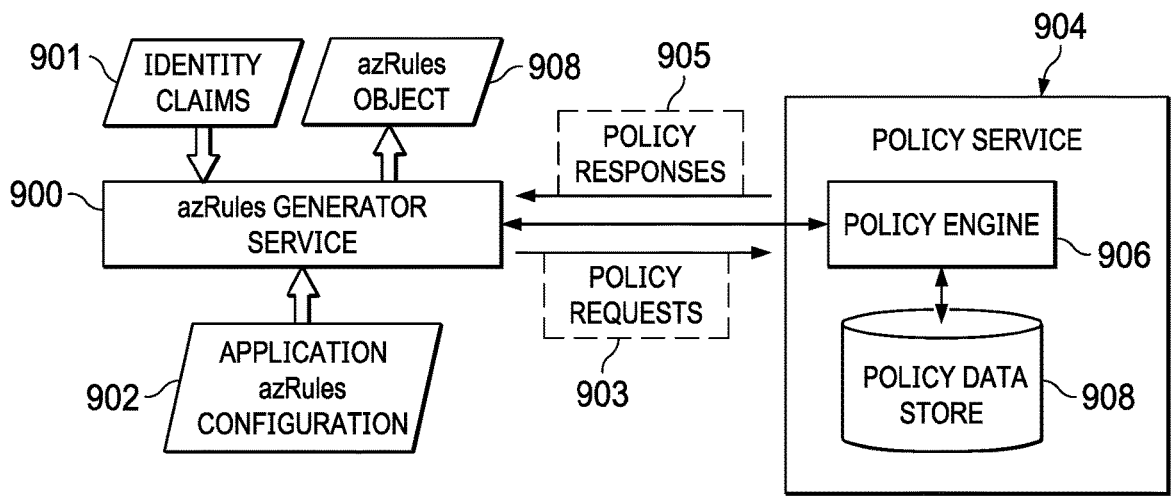
FIG. 9 depicts a technique to generate an authorization object that encapsulates a set of one or more authorization rules derived from a set of one or more higher level policies according to the approach of this disclosure.

FIG. 9 depicts how a runtime authorization object is created in one embodiment using the azRules generator engine such as depicted in FIG. 8. In this embodiment, an azRules generator service 900 uses an application azRules configuration 902. Preferably, the azRules configuration defines (i) one or more authorization entities for the application (which are reflected in the azRules object); (ii) for each such authorization entity, a mapping between the entity and one or more applicable policies (e.g., business policies); and (iii) for each such mapping, how the evaluation of each policy is to be reflected in the azRules object (i.e., how to translate the policy into specific authorization rules applicable to a given user). To create an azRule object for a specific user and application, preferably the configuration is processed such that the applicable policies are evaluated in the context of the user, mapped against the appropriate application entities, and then transformed into an azRules object.

Referring back to FIG. 9, an identity claim 901 is received/obtained. As described in FIG. 10, the identity claim may be received within the context of a session establishment, but this is not a requirement. The generator service 900 consults the application azRules configuration 902 and generates a policy request 903 to an external policy service 904 that comprises policy engine 906 and a data store 908 that hosts policy data. The policy service 904 returns a policy response 905, which the azRules generator service 900 then uses to create the azRules object 908, which is then made available for use by an application as previously described. The underlying policy service implementation (in this case, policy engine 906 and data store 908) is not an aspect of this disclosure. It may be based on XACML (as in FIG. 4) or any other technology that allows it to be used as a common policy service for purposes of creating authorization objects as described herein.

Figure 10:
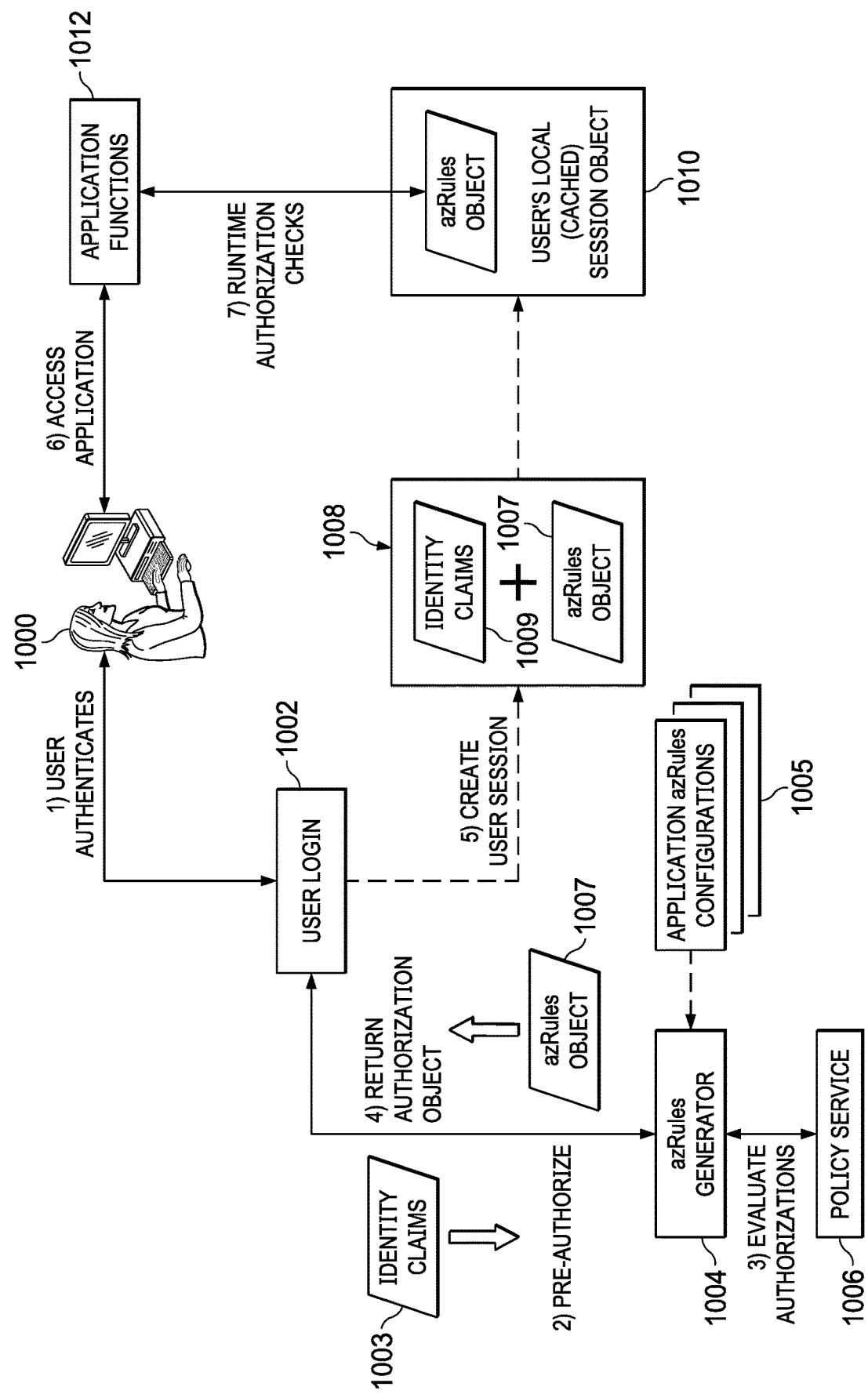
FIG. 10 depicts one embodiment in which an azRules authorization object of this disclosure is generated within a session creation flow and then used to facilitate a runtime authorization required by an application or service.

FIG. 10 depicts an alternative embodiment wherein azRules object generation occurs within a session creation flow associated with a user access to an application. In this embodiment, and at step (1), a user 1000 authenticates via a user login process 1002 in a conventional manner. At step (2), an identity claim 1003 is generated and sent to an azRules generator 1004. As described in FIG. 9, the azRules generator 1004 consults an application azRules configuration 1005 and issues an evaluation request to a policy service 1006. This is step (3). In this embodiment, the policy service 1006 is a common service external to the application. Based on the application azRules configuration and the applicable policy, the azRules generator 1004 generates an azRules object 1007 that, at step (4) is then returned to the user login process 1002. In this manner, the azRules object 1007 is tailored to the specific application. The user login process 1002 then continues at step (5) to create a user session 1008. To this end, the generated azRules object 1007 is associated with an identity claim 1009 for the user and cached at the user's local session object 1010. The session object 1010 may also be maintained in an application session store or in some other container. The user then accesses the application (at step (6)). When a runtime authorization check is subsequently required, the applicable application function 1012 performs the check against the user's local session object 1010 that includes the azRules object 1007 that has been generated for the session. Based on the evaluation of the object, the runtime authorization check is successful or not. This completes the processing.

Thus, and in accordance with the embodiment shown in FIG. 10, at the time the user is authenticated or an SSO transaction is processed, a user session is established. In the course of session establishment, the azRules generator is invoked, which, utilizing the appropriate policy service(s) and target application/service information, creates an azRules object for the user. A session object is created containing typical claims, with the addition of the azRules object. The session object is cached, presumably via an appropriate caching service, for example, Redis. When a request is received for which an authorization decision is required, the application/service makes a call to the azRules runtime, providing the appropriate input such as the entity/operation requiring authorization. The azRules runtime accesses the azRules object through the session object, performs the appropriate evaluation, and returns an authorization decision to the caller.

Although not depicted in FIG. 10, it should be appreciated that various other components may be present and also external to the application, e.g., when using federated-SSO or an external authorization engine. In an SSO scenario, e.g., an identity provider (IdP) knows what application the user is trying to access, and thus the above-described azRules object generation may also be carried out within a service provider-IdP workflow.

While the above-described embodiment uses a "push" model for the azRules object (i.e. providing it through a session object provided to the application), a "pull" model may be used. In this variant, the application retrieves the azRules object directly from the azRules generator via an API call as part of its session initialization.

The following section provides a concrete example of the above-described approach.

In this example, assume that the authorization calls use a combination of "entity," "access," "context" and "qualifier," with the last two being optional, and the authorization runtime module within the application exposes the following interfaces:
Initialize the authorization runtime:
void azSetObject(azRulesObject);
Authorization request:
boolean azAuth (entity, access, context, qualifier);
The runtime interfaces might be used as in the below:
Initialize runtime:
azSetObject(session["azRules"]).
Can User make a $2000 purchase?:
yesno=azAuth("purchase", "create", null, 2000);
Can User update product listings for the French marketplace?
yesno=azAuth("marketplace", "update", "france", null);
Can User delete marketplace product listings?
yesno=azAuth("product", "delete", null, null).

Now, and using the technique described, assume an azRules object is generated at login time and contains a collection of rules. A representative azRules object for this scenario is depicted in FIG. 11. In this example, there are two (2) entities, namely, "purchaseApprove" and "purchaseRecordAccess." For purchaseApprove, there are two (2) azRules. In this example, both apply to approving a newly-submitted purchase request (create) or an existing request (update). The first rule permits approval of software purchases up to $1,000. The second permits hardware or services approval up to $10,000. A rule matching the access type and context is used to provide an "allow" decision. If there is no rule match, the result is "deny." As noted, the rules may have been computed from any of a variety of business policies that need not be known by the application—for example, if the user is in a particular job role in the purchasing department who is a certified purchasing agent. The purchaseRecordAccess also has two (2) azRules; in this example, one is evaluated locally and the other is evaluated via a call to an external authorization endpoint. The locally-evaluated rule allows viewing of newly-submitted and in-process purchase requests. If the access type and context match, the local rule takes precedence and returns an "allow" result. The externally-evaluated rule applies when the local rule will not apply. The external call includes the appropriate entity/value/context/identity information from the application and returns an allow or deny decision in the same manner as a traditional external authorization engine.

Although not shown in the above example, an azRule can support more sophisticated constructs, for example, multiple and various types of qualifiers. Also, specific evaluation rules, such as those for precedence, can differ among implementations.

When authorization checks take place in a local process context, they are extremely fast and immune to upstream outages. In most cases, it is possible to locally handle runtime authorizations. Yet in the case external service calls are required, they are also readily supported as shown above in this example.

Generalizing, a set of one or more simplified authorization rules for the user are generated, preferably based on evaluation of a higher-level set of one or more policies associated with the target application, pre-evaluated against the user's (the subject's) identity claims, and stored (as the authorization object) in the context of the target application's session metadata itself. Subsequent authorizations (as required by the application function) are then performed directly against these simplified rules, rather than from the policies from which they were derived. The approach obviates a client-server based authorization model. Instead, the technique provides a client-centric authorization model that as has been described and depicted utilizes locally-evaluated rules derived from (preferably) non-local policies and provided to the client via an authorization object in the subject's session context. Preferably, the approach does not involve a determination regarding the policy or policies; rather, one or more existing policies are merely used to derive authorization rules associated with a subject, and which are then evaluated and enforced at runtime in a computationally-efficient matter within the local context of the application or service.

The technique of this disclosure, wherein pre-computed authorizations are generated and contained within an authorization object locally accessible to an application at runtime, provides significant advantages. The approach enables more computationally-efficient runtime authorization checks to be performed locally, thereby reducing load on external policy engines, and minimizing application state management requirements. An authorization object of this type thus embodies what are typically higher-level externally-maintained business policies but in a simple easy-to-evaluated form for runtime use. The nature of the policy may vary and any underlying policy service implementation may be leveraged. The authorization objects may be generated within the actual user session workflow, or external to that workflow (out-of-band), provide additional implementation flexibility.

The technique herein may be implemented even in cases where an internal authorization decision is not appropriate; in this scenario, the azRules object implementation simply contains pointers to an appropriate external service. Using a runtime library for the azRules evaluation, this allows for such external references to be entirely transparent to the application.

By generating an azRules object independent of underlying business policy in combination with a local authorization runtime, applications can achieve the performance benefit of making authorization decisions locally, derived from governing enterprise business policies, and separable from internal application logic.

The technique herein can also be implemented irrespective of whether the application or service has connectivity to an external authorization/policy service. A representative use case of this type would be one in which the application is hosted at a provider that does not have connectivity to the governing policy engine, yet is integrated with an identity provider via an SSO mechanism, such as SAML or OIDC. In this example, an azRules object is constructed that reflects the applicable policies and passed to the application via the identity claims. In this manner, even applications maintained in otherwise disconnected environments are supported.

In a proxy scenario, the authorization object as described herein may be dynamically inserted by the proxy, thereby allowing the application to be stateless.

The technique herein is not specific to any particular application model, and it may be implemented in client-side or server-side configurations. Indeed, even applications that are implemented entirely server-side or have a significant server-side component can be built on a microservices (or an SOA) model and thereby benefit. For example, and using the technique herein, such applications can issue calls one or more microservices that, in turn, can also access an azRules object and perform authorizations locally. The azRules object accessed by a microservice may be made available in any convenient manner, e.g., by a session cache, or the server-side calling component may include the azRules object in the request to the microservice. This latter approach may be used for the case where one microservice is calling another microservice.

Summarizing, the authorization model herein advantageously separates governing policy from runtime authorization decision processing using a simple and compact authorization object (azRules) in a normalized form, computing the authorization object preferably at session creation (login) time, providing the authorization object to an application/service preferably via session or other appropriate state context, and making authorization decisions within an application/service context via the information contained within the authorization object (azRules). This paradigm differs from existing approaches that, as noted, merely replicate policy or authorization data stores. The authorization mechanism is useful in any application architecture, from monolithic- to pure microservice-based models, as well as others.

One or more aspects of the technique, e.g., the azRules object generation, may be performed in a cloud computing environment (FIG. 3), or otherwise leverage cloud-compute resources.

The azRules object generation functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

The techniques herein are not limited to use with a microservices-based application, although this type of application implementation benefits significantly from the approach. Indeed, the approach benefits any application implementation that performs authorization including, without limitation, those based on monolithic models, object-oriented models, and others.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures other than cloud-based infrastructures. These include, without limitation, simple n-tier architectures, web portals, federated systems, and the like.

Still more generally, the subject matter described herein can take the form of an entirely hardware embodiment, an entirely software embodiment or an embodiment containing both hardware and software elements.

Furthermore, the user impersonation/delegation functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the azRules generator or runtime-based components are implemented in a special purpose computer, preferably in software executed by one or more processors. The software also is maintained in one or more data stores or memories associated with the one or more processors, and the software may be implemented as one or more computer programs.

The azRules generator function may be implemented as an adjunct or extension to an existing security (authentication) service, or access manager solution. The technique also may be implemented in an automated manner, as has been described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, e.g., microservices, monolithic systems/applications, object-oriented systems/applications, runtime application authorization systems, and policy management systems.

What is claimed is as follows:

1. A method to perform an authorization in association with an application, comprising:
   receiving from the application a request for which an authorization decision is required;
   in response to receipt of the request, evaluating identity information against one or more authorization rules that are configured according to a local, runtime application context, the one or more authorization rules having been derived by a policy service from a policy; and
   returning to the application an authorization decision, wherein the authorization decision is made during runtime execution and based on evaluating the authorization rules in lieu of the policy.

2. The method as described in claim 1 further including issuing a request to the policy service to generate the one or more authorization rules.

3. The method as described in claim 2 wherein the request is issued to the policy service during establishment of a user session.

4. The method as described in claim 3 further including receiving a session object that comprises the identity information as an identity claim, together with an authorization object that encapsulates the one or more authorization rules.

5. The method as described in claim 4 wherein the authorization object is implemented as one of: a JSON object and an XML object.

6. The method as described in claim 1 wherein the application is configured according to an application architecture model, the model being one of: a microservice model, an object-oriented model, and a monolithic application model.

7. The method as described in claim 1 wherein at least one authorization rule comprises one of: a specific authorization that can be made against one or more application entities, wherein the specific authorization incorporates at least one of: a specific permission, a bound or limit, and a scope, and a pointer to an external authorization service.

8. The method as described in claim 1 wherein the policy is a high-level business policy.

9. Apparatus, comprising:
   at least one hardware processor;
   computer memory holding computer program instructions executed by the at least one hardware processor to perform an authorization in association with an application, the computer program instructions comprising program code configured to:
      receive from the application a request for which an authorization decision is required,
      in response to receipt of the request, evaluate identity information against one or more authorization rules that are configured according to a local, runtime application context, the one or more authorization rules having been derived by a policy service from a policy; and
      return to the application an authorization decision, wherein the authorization decision is made during runtime execution and based on evaluating the authorization rules in lieu of the policy.

10. The apparatus as described in claim 9 wherein the computer program code is further configured to issue a request to the policy service to generate the one or more authorization rules.

11. The apparatus as described in claim 10 wherein the request is issued to the policy service during establishment of a user session.

12. The apparatus as described in claim 11 wherein the computer program code is further configured to receive a session object that comprises the identity information as an identity claim, together with an authorization object that encapsulates the one or more authorization rules.

13. The apparatus as described in claim 12 wherein the authorization object is implemented as one of: a JSON object, and an XML object.

14. The apparatus as described in claim 9 wherein the application is configured according to an application architecture model, the model being one of: a microservice model, an object-oriented model, and a monolithic application model.

15. The apparatus as described in claim 9 wherein at least one authorization rule comprises one of: a specific authorization that can be made against one or more application entities, wherein the specific authorization incorporates at least one of: a specific permission, a bound or limit, and a scope, and a pointer to an external authorization service.

16. The apparatus as described in claim 9 wherein the policy is a high-level business policy.

17. A computer program product in a non-transitory computer-readable medium for use in a data processing system, the computer program product holding computer program instructions executed by the data processing system to perform an authorization in association with an application, the computer program instructions comprising program code configured to:
   receive from the application a request for which an authorization decision is required,
   in response to receipt of the request, evaluate identity information against one or more authorization rules that are configured according to a local, runtime application context, the one or more authorization rules having been derived by a policy service from a policy; and
   return to the application an authorization decision, wherein the authorization decision is made during runtime execution and based on evaluating the authorization rules in lieu of the policy.

18. The computer program product as described in claim 17 wherein the computer program code is further configured to issue a request to the policy service to generate the one or more authorization rules.

19. The computer program product as described in claim 18 wherein the request is issued to the policy service during establishment of a user session.

20. The computer program product as described in claim 19 wherein the computer program code is further configured to receive a session object that comprises the identity information as an identity claim, together with an authorization object that encapsulates the one or more authorization rules.

21. The computer program product as described in claim 20 wherein the authorization object is implemented as one of: a JSON object, and an XML object.

22. The computer program product as described in claim 17 wherein the application is configured according to an application architecture model, the model being one of: a microservice model, an object-oriented model, and a monolithic application model.

23. The computer program product as described in claim 17 wherein at least one authorization rule comprises one of: a specific authorization that can be made against one or more application entities, wherein the specific authorization incorporates at least one of: a specific permission, a bound or limit, and a scope, and a pointer to an external authorization service.

24. The computer program product as described in claim 17 wherein the policy is a high-level business policy.

\* \* \* \* \*